US009771968B2

(12) United States Patent
Duchatelle et al.

(10) Patent No.: US 9,771,968 B2
(45) Date of Patent: Sep. 26, 2017

(54) TURBINE ENGINE DRIVE SHAFT DEVICE (75) Inventors: Thierry Francois Maurice Duchatelle, Meigneux (FR); Virginie Guilbert, Corbeil Essonnes (FR); Cedric Magret, Paris (FR); Thierry Georges Paul Papin, Varennes-Jarcy (FR)

(73) Assignee: SNECMA, Paris (FR)

( * ) Notice: Subject to any disclaimer, the term of this patent is extended or adjusted under 35 U.S.C. 154(b) by 944 days.

(21) Appl. No.: 14/129,458

(22) PCT Filed: Jul. 3, 2012

(86) PCT No.: PCT/FR2012/051538
§ 371 (c)(1),
(2), (4) Date: Dec. 26, 2013

(87) PCT Pub. No.: WO2013/004964
PCT Pub. Date: Jan. 10, 2013

(65) Prior Publication Data
US 2014/0135134 A1 May 15, 2014

(30) Foreign Application Priority Data

Jul. 4, 2011 (FR) ..................................... 11 56010

(51) Int. Cl.
*F01D 25/16* (2006.01)
*F16C 3/02* (2006.01)
(Continued)

(52) U.S. Cl.
CPC .............. *F16C 3/023* (2013.01); *F01D 9/065* (2013.01); *F01D 25/162* (2013.01); *F02C 7/32* (2013.01)

(58) Field of Classification Search
CPC .. F02C 7/32; F02C 7/06; F01D 25/162; F01D 25/16; F01D 25/243; F01D 25/246; F01D 9/065; F16C 3/023
See application file for complete search history.

(56) References Cited

U.S. PATENT DOCUMENTS 2,803,943 A * 8/1957 Rainbow .................... F02C 7/32
60/262
2,928,648 A * 3/1960 Haines ..................... F01D 9/065
384/418
(Continued)

FOREIGN PATENT DOCUMENTS

EP 0 147 351 7/1985
EP 2 045 447 4/2009
(Continued)

OTHER PUBLICATIONS

Office Action issued Jul. 5, 2016 in Japanese Patent Application No. 2014-517898 (submitting English translation only).
(Continued)

*Primary Examiner* — Woody Lee, Jr.
*Assistant Examiner* — Joshua R Beebe
(74) *Attorney, Agent, or Firm* — Oblon, McClelland, Maier & Neustadt, L.L.P.

(57) ABSTRACT

A vaned wheel device traversed by a radial drive shaft includes radial arms, one of which contains the shaft, and stationary vanes manufactured separately from the casing and a ferrule and assembled thereto. A sleeve encompassing the shaft traverses the casing and serves to support a bearing for supporting the shaft with positional accuracy, and maintaining tightness by forming a single cavity with the radial arm cavities traversing the shaft.

11 Claims, 6 Drawing Sheets (51) Int. Cl.
*F01D 9/06* (2006.01)
*F02C 7/32* (2006.01)

(56) References Cited

U.S. PATENT DOCUMENTS

| | | | | |
|---|---|---|---|---|
| 3,799,476 | A | * | 3/1974 | Bouiller .................. B64D 41/00 |
| | | | | 244/53 R |
| 3,850,544 | A | * | 11/1974 | Ciokajlo ................. F01D 9/065 |
| | | | | 415/149.4 |
| 3,907,386 | A | | 9/1975 | Kasmarik et al. |
| 4,566,269 | A | | 1/1986 | Gingras |
| 4,598,600 | A | | 7/1986 | Knowles |
| 5,160,251 | A | * | 11/1992 | Ciokajlo ................. F01D 25/162 |
| | | | | 415/142 |
| 2005/0100258 | A1 | | 5/2005 | Brossier et al. |
| 2005/0249443 | A1 | | 11/2005 | Brossier et al. |
| 2008/0173114 | A1 | * | 7/2008 | Charier .................. F01D 25/183 |
| | | | | 74/15.63 |
| 2009/0064683 | A1 | * | 3/2009 | Moniz ..................... F02C 7/275 |
| | | | | 60/792 |
| 2009/0104027 | A1 | * | 4/2009 | Duchatelle .............. F01D 9/065 |
| | | | | 415/175 |
| 2010/0207379 | A1 | * | 8/2010 | Olver .................... F16L 23/167 |
| | | | | 285/13 |
| 2011/0073745 | A1 | * | 3/2011 | Duchatelle ................ F01D 9/04 |
| | | | | 248/637 |

FOREIGN PATENT DOCUMENTS

| | | | | |
|---|---|---|---|---|
| FR | 2 824 362 | | 11/2002 | |
| FR | 2 921 423 | | 3/2009 | |
| FR | 2921423 | A1 | 3/2009 | |
| GB | 819814 | A * | 9/1959 | ............ F01D 9/065 |
| GB | 926 947 | | 5/1963 | |
| JP | 10-37764 | A | 2/1998 | |
| JP | 2003-269191 | A | 9/2003 | |
| JP | 2003-269192 | A | 9/2003 | |

OTHER PUBLICATIONS

U.S. Appl. No. 14/272,911, filed May 8, 2014, Cretin, et al.
International Search Report Issued Sep. 10, 2012 in PCT/FR12/051538 Filed Jul. 3, 2012.

* cited by examiner

TURBINE ENGINE DRIVE SHAFT DEVICE

The present invention relates to a turbine engine drive shaft device.

Such shafts extend radially through turbine engines and are suitable for setting the start-up of the engine, or moving another item of central equipment, externally. They pass through the gas flow passages while encased in radial arms, which should result in low levels of disturbance in the flow and efficiency losses, and also be tight to prevent leakages of lubricant into the flow. A bearing is frequently arranged around an intermediate portion of the shaft so as to support same. Reference shall be made to the French patents 2 824 362 and 2 921 423 to discover some existing designs, but which are unrelated to the invention, of such drive shafts. A further design is disclosed in the document GB-A-926 947.

Existing stators frequently have a unitary structure comprising a circular, so-called intermediate casing, a so-called outer ferrule, which is circular and concentric with the casing and encompassing same, and flow guide vanes joining the casing with the ferrule while being integral therewith. Radial arms are arranged in places in the vane circle so as to reinforce the connection of the casing and the ferrule and are also rigidly connected thereto; one of these arms contains the drive shaft. The shaft support bearing is generally mounted on a standalone supporting member, comprising a mounting flange bolted to an end flange of the intermediate casing.

The lubrication of equipment adjacent to the shaft, such as the bearing, should be provided, either from inside the shaft by centrifugation and arrangement of lubrication ducts, baffles and scoops, or by an external supply. So as not to diffuse oil in the circular casing traversed by the shaft, cylindrical sheaths are added around the shaft so as to hold the volume contained therein. However, it should be acknowledged that these sheaths represent a complication of the engine structure, and that they require an increase in the width of the radial arm in order to be housed therein, and thus of the mid-section of the arm section, impeding gas flow. Mounting the bearing on a supporting member bolted to the casing also introduces a lack of positional precision adversely affecting correct shaft alignment. Finally, maintaining tightness between the lubricated areas surrounding the shaft and the exterior of the wheel, and notably the flow passages, would become more difficult if the radial arms were no longer integral with the outer ferrule and the intermediate casing but assembled therewith; however, this design would be advantageous, as it is less complex to manufacture than the unitary design and makes it possible to replace vanes if required.

The invention relates to a turbine engine drive shaft device suitable for preventing these various drawbacks and which is notably compatible with a turbine engine design wherein the vanes and the radial arms are assembled with the ferrule and the casing after being manufactured separately.

This radial arm is in principle a guide profile situated behind the blower vanes and integrated in the intermediate casing; it is commonly referred to as "OGV arms" and mechanically integrated in the intermediate casing.

It is suitable for providing three functions mentioned or suggested above:
an aerodynamic guide function;
a structural strength function in respect of the intermediate casing and thus the turbine engine;
a mechanical integration function which is the formation of a housing for the intermediate bearing of the radial shaft.

This "OGV arm" is tight in order to integrate the intermediate bearing of the drive shaft.

In a general embodiment, the invention relates to a turbine engine drive shaft device comprising, besides the shaft, a circular casing, a circular ferrule encompassing the casing, a hollow radial arm connecting the casing to the ferrule and traversed by the shaft, also extending into the casing, a shaft support bearing mounted on a supporting member secured on the casing, the radial arm being assembled with the casing without being integral therewith, the radial arm comprising a boss provided with a borehole, the device being characterised in that it comprises a sleeve for coupling the arm with the casing, the boss and the sleeve are assembled by engaging into each other, the shaft extends through the boss and the sleeve, a seal creates tightness between the sleeve and the boss, and the bearing is mounted in the sleeve.

The sleeve encompassing the drive shaft resembles the sheath according to the known design, but does not extend into the radial arm and acts rather as a coupling between the arm and the casing, ensuring tightness from the exterior, whereas the coupling according to the conventional design was provided by material continuity. The tightness provided by the sleeve equipped with the seal makes it possible to do away with the continuity between the radial arm and the casing; the absence of a sleeve or sheath in the radial arm is suitable for reducing the width thereof and promotes the gas flow around the arm; finally, using the sleeve for mounting the bearing represents a significant advantage since the sleeve is fitted against the casing with satisfactory precision at a location generally adjacent to that of the bearing mounting and along the axis thereof.

A similar design may advantageously be proposed on the other side of the radial arm: the latter is also assembled with the ferrule without being integral therewith, and the device comprises a further coupling sleeve, connecting the ferrule to the arm by creating tightness, the other passing through said other sleeve.

The radial arm, as for the guide vanes generally present, may then be constructed independently of the ferrule and assembled therewith with no loss of tightness. The second sleeve further represents a short coupling between the ferrule and the OGV arm, enabling freedom of position between the outer ferrule of the casing and the OGV arm while ensuring the tightness of the cavity created traversed by the drive shaft.

The sleeve (or sleeves when both exist) advantageously comprises two cylindrical bearings respectively inserted into a bored boss of the arm and a bored boss belonging either to a casing or to the ferrule, the bearings continuing from the seals extending around the bearings. Assembly is thus particularly easy.

In other designs, the sleeve may however be integral with the casing.

The sleeve extends advantageously through the casing, from an outer radius to inner radius thereof, and thus alone helps prevent the diffusion of lubricant inside the casing. A simple design suitable for obtaining such a result is available when the casing comprises two bored bosses in the continuity whereof two cylindrical bearings of the sleeve are respectively inserted, seals being arranged between the bosses and the bearings.

The invention will frequently be applied to two-flow turbine engines comprising two concentric flow passages, the casing being an intermediate casing separating said passages. The sleeve will thus act as a tight connection of the cavities traversed by the drive shaft in the radial arm mentioned above (traversing the outer secondary passage) and a further radial arm traversing the inner primary passage.

Lubrication may advantageously be provided via the conduit hollowed in the shaft, and via drilled holes traversing the shaft while extending from the conduit to the bearing, so as to divert some of the lubricant oil to the bearing.

According to a further enhancement, the shaft may consist of two portions joined by grooves, for which lubrication should normally be provided; it may be provided via drilled holes traversing the shaft and extending from the conduit to a circular chamber where the grooves lead.

Further aspects of the invention are an aircraft turbine engine comprising the device described according to the above features, and an aircraft comprising such a turbine engine.

The invention shall now be described with reference to the figures, wherein.

Figure 1:
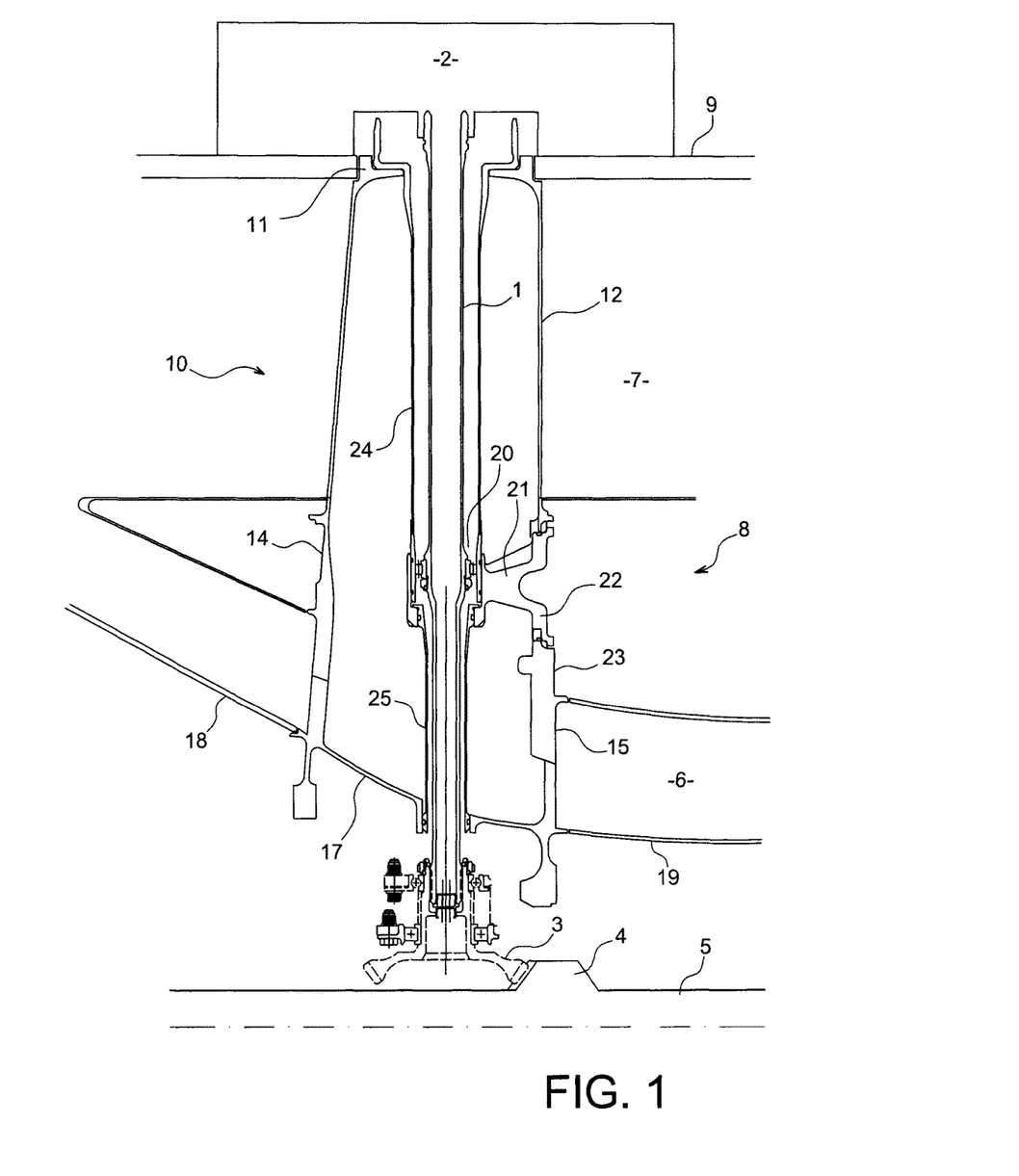
FIG. 1 represents a design according to the prior art.

With reference to FIG. 1, a drive shaft 1 according to a known design extends radially through a turbine engine between an engine device 2 and reduction gear and driving pinion 3 of a gear ring 4 of a central axis 5, situated on the engine axis. The turbine engine having in this case a dual flow 1 extends through a small-radius primary passage 6 and a large-radius secondary passage 7, passing through an intermediate casing 8 separating same as far as a confluent spout. The secondary passage 7 is externally limited by an outer ferrule 9, and the engine device 2 extends to the exterior thereof.

Figure 2:
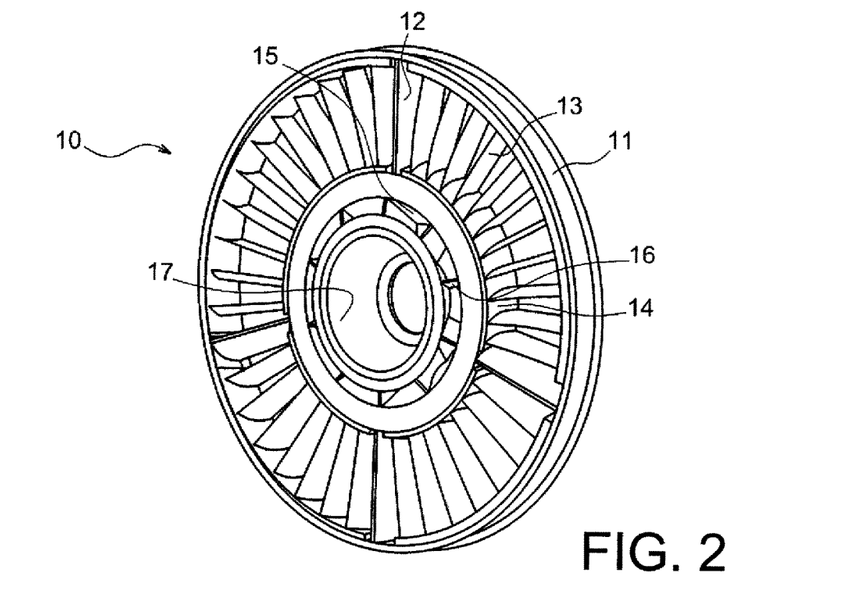
FIG. 2 is a view of a vaned wheel.

With reference also to FIG. 2, it is noted that the turbine engine stator comprises a vaned wheel 10 comprising, from the outside in, a portion 11 of the outer ferrule 9, the radial arms 12 and the guide vanes 13 distributed on a circle through the secondary passage 7, a portion 14 of the intermediate casing 8, further radial arms 15 and further guide vanes 16 also distributed on a circle via the primary passage 6, and an inner skin 17 defining the inner radius of the primary passage 6. The vaned wheel 10 extends between a low-pressure compressor 18 and a high-pressure compressor 19. The structure of the vaned wheel 10 is unitary, all the elements thereof being manufactured in a single piece by casting. The shaft 1 extends through the portions 11, 14 and the inner skin 17, and in one of the radial arms 12 and one of the radial arms 15, traversing same from one end to the other. It is supported by a bearing 20, situated inside the portion 14 of the intermediate casing 8 and supported by a supporting member 21 provided with a flange 22 for mounting on a flange 23 to the rear of the portion 14. The shaft 1 is encompassed by an outer sheath 24 extending from the portion 11 of the outer ferrule 9 to the supporting member 21 and via an inner sleeve 25 extending from the supporting member 21 to the inner skin 17, and wherein each thus extends into the radial arm 12 or 15. The sheaths 24 and 25 define with the supporting member 21 an enclosed volume particularly containing the bearing 20, which can thus be lubricated without causing oil dispersion.

This design has disadvantages mentioned above due to the presence of the sheaths in the radial arms and the type of supporting member used for the bearing.

Figure 3:
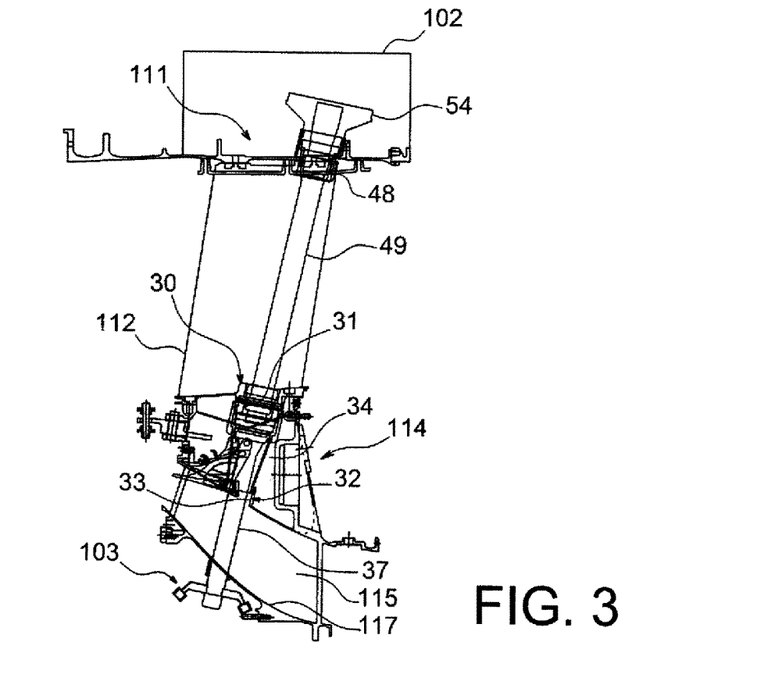
FIG. 3 is a general view of a possible embodiment of the invention.
Figure 4:
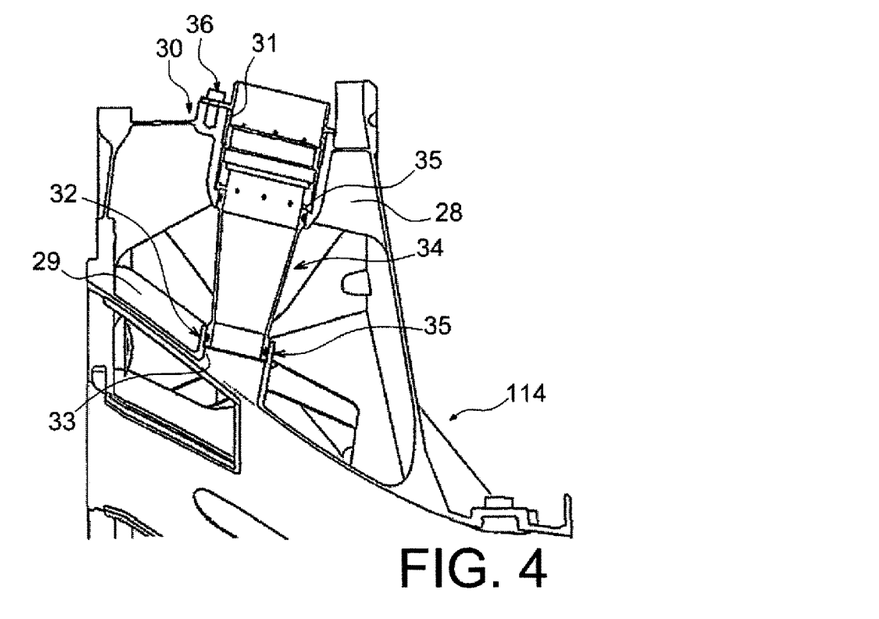
FIGS. 4, 5, 6, 7 and 8 are detailed views of this embodiment.

An embodiment of the invention shall now be described using the following figures, and firstly FIGS. 3 and 4.

The unitary vaned wheel 10 is replaced by a vaned wheel of a similar shape but where the guide vanes and the radial arms are bolted to the elements connected thereto, the intermediate casing portion (now 114) and the ferrule portion (now 111) now being manufactured separately.

The intermediate casing portion 114 is provided with a boss 30 at the outer periphery thereof, which is positioned in front of an outer radial arm 112. The boss 30 comprises a cylindrical borehole 31. A further boss 32 is arranged in front of an inner radial arm 115 (passing through the primary passage 6) also comprising a borehole 33, extending from the previous borehole 31. A sleeve 34 is inserted into the boreholes 31 and 33, the ends thereof being cylindrical bearings pressing on the boreholes 31 and 33, provided with O-rings 35 creating the tightness at said boreholes 31 and 33. The sleeve 34 is held by the bolts 36 inserted into the boss 30. The bosses 30 and 32 are arranged at the ends of the intermediate casing portion 14, supported by ribs 28 and 29. The inner boss 32 opens directly into the inner radial arm 115, which is integral with the intermediate casing portion 114 and with the inner skin 117.

Figure 9:
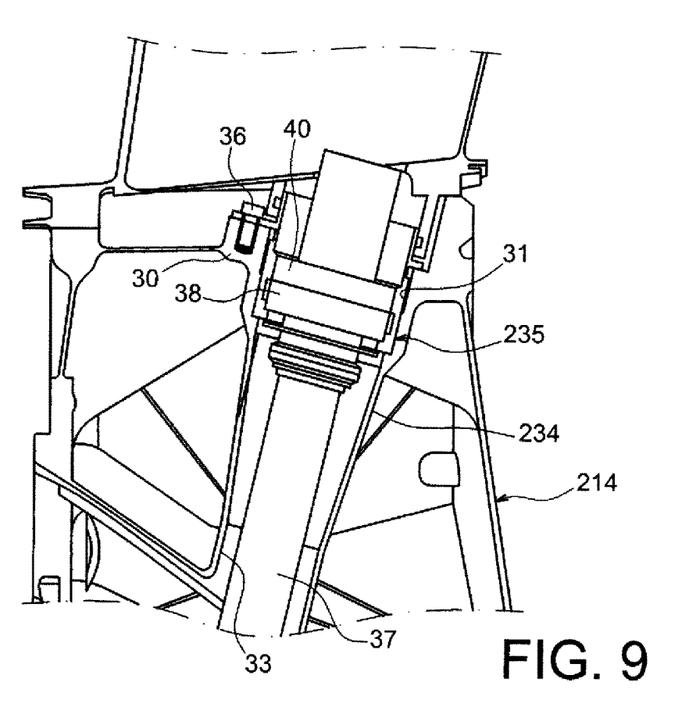
FIG. 9 is an alternative embodiment belonging to a further embodiment.

According to an alternative design illustrated in FIG. 9, the intermediate casing portion, now 214, is integral with a first sleeve 234, extending from the boreholes 31 and 33. However, a second sleeve 235 is constructed separately and inserted into the outer borehole 31, and is shaped similar to the sleeve 34 in terms of receiving the bearing 38, attaching the boss 30 with bolts 36 and the presence of a seal between the cylindrical bearing thereof and the borehole 31.

The sleeves 234 and 235 together thus replace the sleeve 34, with the advantages that the second sleeve 235, which is short and secured in a single borehole 31, is easy to install, and that there is no sealing device for the inner borehole 33.

Figure 5:
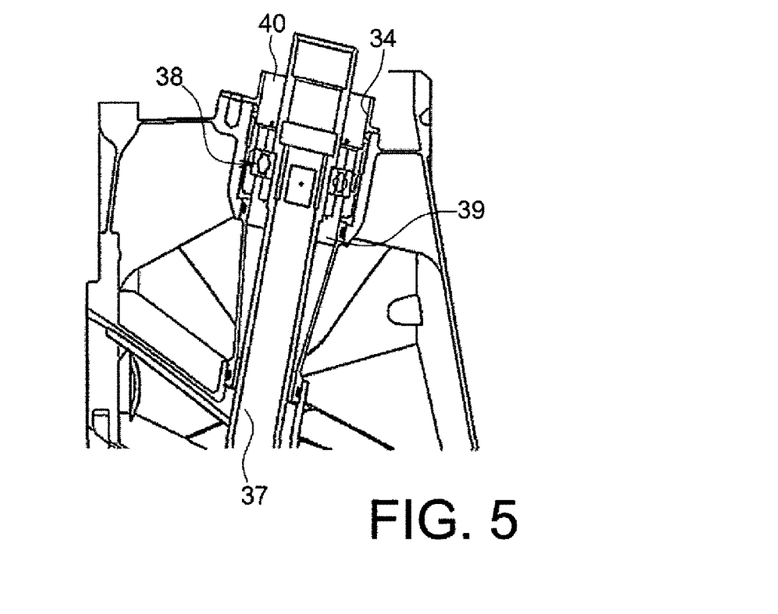
Figure 6:
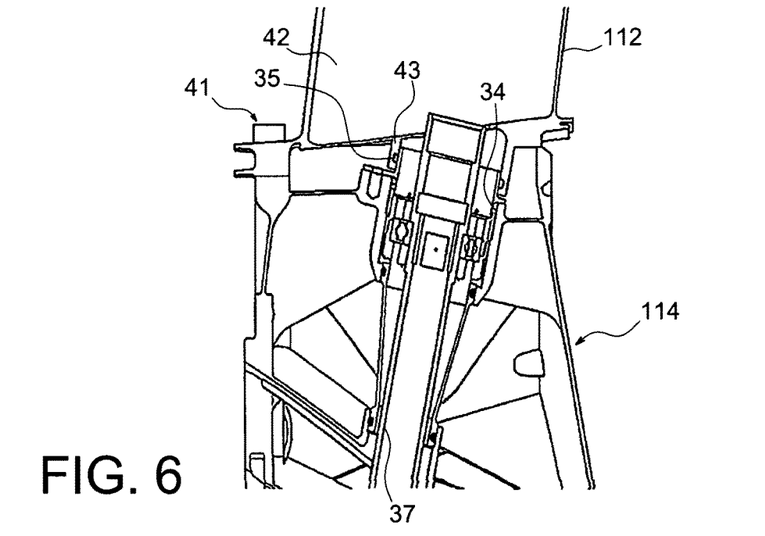

The drive shaft comprises two parts, one whereof is a primary shaft 37 which extends into the sleeve 34, and then inwards and ends on the driving pinion, now 103. A bearing 38 (FIG. 5) is arranged between the primary shaft 37 and the sleeve 34 to support same therewith; the inner ring and outer ring thereof are held in the axial direction by two nuts 39 and 40 respectively screwed onto the primary shaft 37 and into the sleeve 34, and they abut against opposite shoulders. The outer radial arms, and the outer passage guide vanes, constructed separately, are mounted on the intermediate casing element 114 with bolts 41 (only one is shown). One end of the primary shaft 37 extends outside the sleeve 34 and projects into a cavity 42 of the outer radial arm 112. The inner face of radial arm 112 comprises a bored inner boss 43 engaged on the outer end of the sleeve 34, which is also provided with a seal 35 to create the tightness therebetween (FIG. 6).

Figure 7:
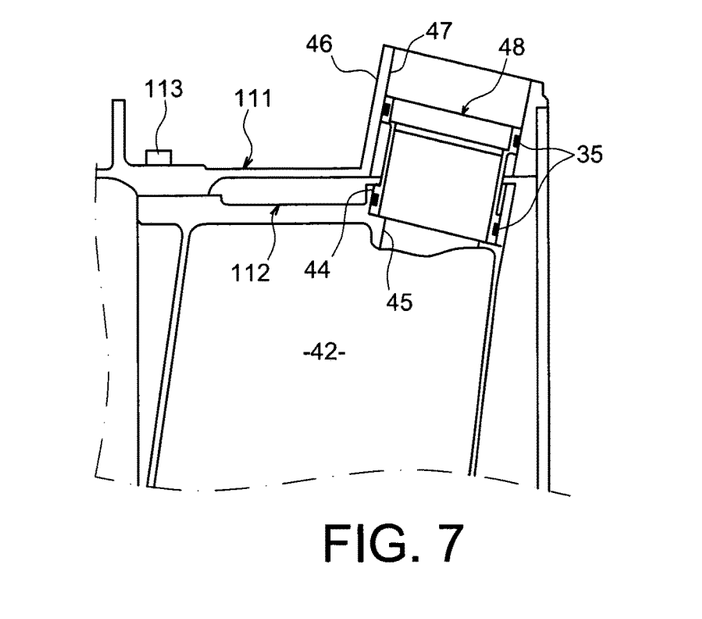
Figure 8:
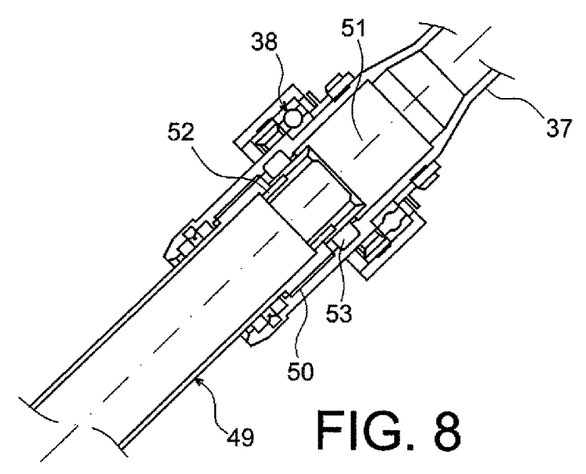

The radial arm 112 comprises (FIG. 7) an outer boss 44, opposite the previous one and also provided with a borehole 45. When the ferrule element 111 is fitted and joined to the radial arm 112 with bolts 113, a boss 46 comprised therein extends onto the outer boss 44 and a borehole 47 of the boss 46 extends the borehole 45. A second sleeve 48 is inserted into the boreholes 45 and 47 and has two cylindrical bearings also provided with O-rings 35 to create tightness between these boreholes. This two-sleeve arrangement connects the cavity 42 of the radial arm 112 to the outside of the ferrule, containing the engine unit corresponding to the engine unit 2, and to the volume close to the engine axis containing the driving pinion 103 without compromising tightness and particularly without allowing communication with the gas flow passages, the sleeve 34 connecting the cavity 42 of the outer radial arm 112 to that of the inner radial arm 115. A second shaft 49, forming the drive shaft with the primary shaft 37 and extending from the outer unit 102, passes through the cavity 42 and extends as far as the sleeve 34, where it is joined to the primary shaft 37 by grooves 50.

It should be noted that the primary shaft 37 and the second shaft 49 may be inclined towards the engine axis, in this case to the rear towards the engine periphery, and that the radial arm 112 is then advantageously inclined by an equivalent angle so that the secondary shaft is constantly in the same zone adjacent to the wider rear edge of the cavity 42 and that there is thus no obligation to widen the radial arm 112 elsewhere.

A centring bowl 54 (FIG. 3) of the secondary shaft 49, of a known design and conical cylindrical shape, mounted in a manner not shown in the engine device 2, is entirely included therein, while the lower part thereof entered the radial arm (12) according to the prior design. Adding the sealing sleeve 48, which dispenses the centring bowl 54 of this sealing function between the radial arm (12) and the engine device 102, makes it possible to absorb the loads transmitted by the secondary shaft 49 by the engine device 102 alone and thus relieve the radial arm 112, without needing to reinforce same.

The lubrication of the device may be performed as follows. Oil originating from the engine unit 102 is injected into a conduit of the secondary shaft 49, which is hollow similar to the primary shaft 37. On arriving at the end of the secondary shaft 49, the oil enters the drilled holes 51 produced through the primary shaft 37 in front of the bearing 38 and lubricates same. A further portion of the oil reaches drilled holes 52 at the end of the secondary shaft 49 and helps lubricate the grooves 50 reaching a circular chamber 53 situated in front thereof. The oil consumed in this way reaches the enclosed cavity encompassing the drive shaft, where it cannot join the flow in the engine or be dispersed in excess and where it can be recovered.

Further solutions are also possible for embodying the invention, which may notably be used in single-flow turbine engines.

Figure 10:
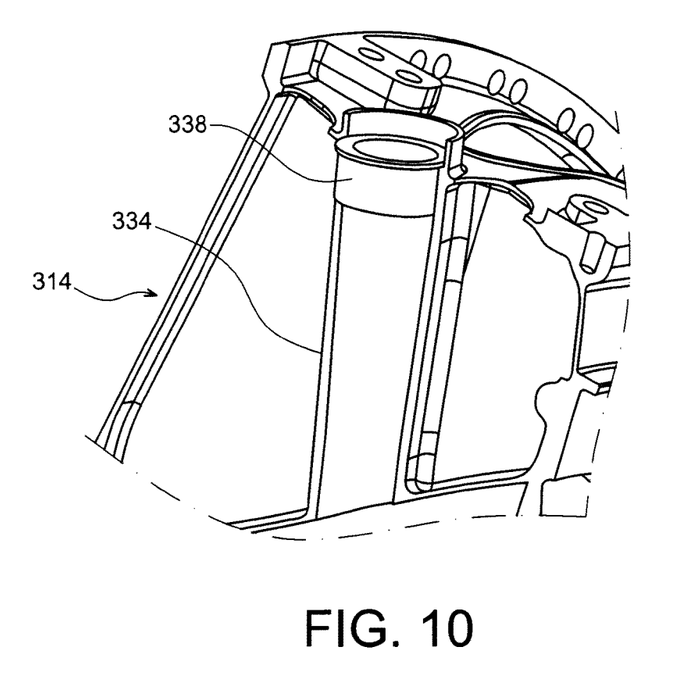
FIG. 10 illustrates a further embodiment.

One of these solutions is thus represented using FIG. 10. The coupling sleeves, hitherto considered as separate parts, may be fact be rigidly connected to further elements of the assembly. In this way, the casing, now 314, may comprise a sleeve 334 integrated therein, i.e. integral therewith, and extending between the two flow passages in the same way as the sleeve 34 from the embodiment in FIG. 4 for example.

One advantage of this design is that the seals which were required between the sleeve 34 and the casing 114 may in this case be omitted. This embodiment may otherwise be identical to the first. However, a further alternative embodiment may be envisaged: the bearing, now 338, housed in the same location as the bearing 38 according to the previous embodiment, may be a smooth bearing instead of a roller bearing as previously represented. Furthermore, this freedom to choose the type of bearing is found in all the embodiments of the invention.

The invention claimed is:
1. A turbine engine drive shaft device comprising:
a shaft;
a circular casing;
a circular ferrule encompassing the casing;
a hollow radial arm connecting the casing to the ferrule and traversed by the shaft, also extending into the casing;
a shaft support bearing mounted on a supporting member secured on the casing;
the radial arm being assembled with the casing without being integral therewith, the radial arm including a boss including a borehole; and
further comprising a sleeve to couple the arm with the casing, the boss and the sleeve are assembled by engaging into each other, the shaft extends through the boss and the sleeve, a seal creates tightness between the sleeve and the boss, and the bearing is mounted in the sleeve, wherein
the bearing is held against opposite shoulders of the sleeve and the shaft by nuts respectively screwed on the shaft and in the sleeve.

2. A turbine engine drive shaft device according to claim 1, wherein the sleeve is integral with the casing.

3. A turbine engine drive shaft device according to claim 1, wherein the sleeve is assembled with a boss of the casing, the boss of the casing including a borehole through which the shaft extends, the boss of the casing and the sleeve are engaged into each other, and a seal creates tightness between the sleeve and the boss of the casing.

4. A turbine engine drive shaft device according to claim 1, wherein the radial arm is also assembled with the ferrule without being integral therewith, the radial arm and the ferrule comprise further bosses including extending boreholes, and
further comprising a coupling sleeve, connecting the ferrule to the arm while being engaged in the boreholes of the further bosses, and further seals creating tightness between the further sleeve and each of the boreholes of the further bosses, the shaft passing through the further sleeve.

5. A turbine engine drive shaft device according to claim 1, wherein the sleeve extends through the casing from an outer radius to an inner radius, and the casing comprises a second bored boss extending from the boss, the sleeve being inserted through the bosses, a seal being arranged between the second boss and the sleeve.

6. A turbine engine drive shaft device according to claim 1, wherein the casing includes a casing sleeve integral therewith and extending from the borehole of the boss of the casing and a borehole of a second boss, the boss and the second boss being at an outer radius and at an inner radius of the casing, and the sleeve is inserted into the casing sleeve.

7. A turbine engine drive shaft device according to claim 5, wherein the casing is an intermediate casing separating two concentric gas flow passages, the radial arm passes through an outer secondary passage, and the second boss extends as far as a further radial arm traversing an inner primary passage.

8. A turbine engine drive shaft device according to claim 1, further comprising a lubrication conduit created in the shaft, drilled holes traversing the shaft from the conduit to the bearing, and the shaft includes two parts joined by grooves, and drilled holes traverse the shaft from the conduit to a circular chamber where the grooves lead.

9. A turbine engine drive shaft device according to claim 1, wherein the shaft is inclined in an axial direction of the turbine engine and the radial arm is also inclined in the axial direction, while being constantly adjacent to a rear edge of the radial arm.

10. A turbine engine comprising a device according to claim 1.

11. An aircraft, comprising a turbine engine according to claim 10.

* * * * *